Jan. 10, 1939.   T. M. KNOWLAND   2,143,627
VULCANIZING MACHINE
Filed Aug. 29, 1936

Inventor
THOMAS M. KNOWLAND,
By Kenway & Witter.
Attorneys

Patented Jan. 10, 1939

2,143,627

UNITED STATES PATENT OFFICE 2,143,627

VULCANIZING MACHINE

Thomas M. Knowland, Belmont, Mass., assignor to Boston Woven Hose & Rubber Company, Cambridge, Mass., a corporation of Massachusetts Application August 29, 1936, Serial No. 98,484

8 Claims. (Cl. 18—6)

This invention relates to machines of the type employing a heated drum in combination with a metallic pressure band for vulcanizing or curing rubber or rubberized products, such, for example, as belting or matting. It is advantageous in some cases to subject the material to be vulcanized to greater pressure in its passage about the drum than can be applied practicably or conveniently by the tension of a single band. Accordingly, the present invention contemplates reinforcing the presure band or supplementing its effective pressure by means of an auxiliary band arranged to make continuous contact with the pressure band substantially throughout its path of engagement with the work. The auxiliary band is herein shown as provided with independent mechanism by which its tension may be controlled and adjusted. The range and capacity of the machine may be thus increased without the necessity of carrying the tension of the pressure band to a dangerously high degree and a more flexible manner of pressure control is made available.

In the copending application of John M. Bierer, Serial No. 83,259 filed June 3, 1936 is disclosed a machine of the above described nature wherein the auxiliary band is of a width substantially coextensive with the width of the pressure band, whereas in my invention as herein disclosed the auxiliary band is narrower than the pressure band and is so arranged that a plurality of loops or reaches thereof make continuous contact with the pressure band substantially throughout its path of engagement with the work. The auxiliary band may be of substantially the same material as that used in the pressure band, but preferably it is in the nature of a relatively narrow and flat band or cable woven from steel wires of great flexibility and high tensile strength, such woven band being well adapted to pass through the required circuitous path without undue strain on the band. Supporting and guiding mechanism so cooperates with the auxiliary band as to carry it to and from the heated drum and keep it in proper alignment thereon.

An important advantage incident to the use of an auxiliary band of this type is that it permits the employment of segmental heaters in close proximity to the circumference of the vulcanizing drum, the heat being transmitted efficiently through the superposed tensioned bands to the surface of the material which is outermost upon the vulcanizing drum.

Figure 1:
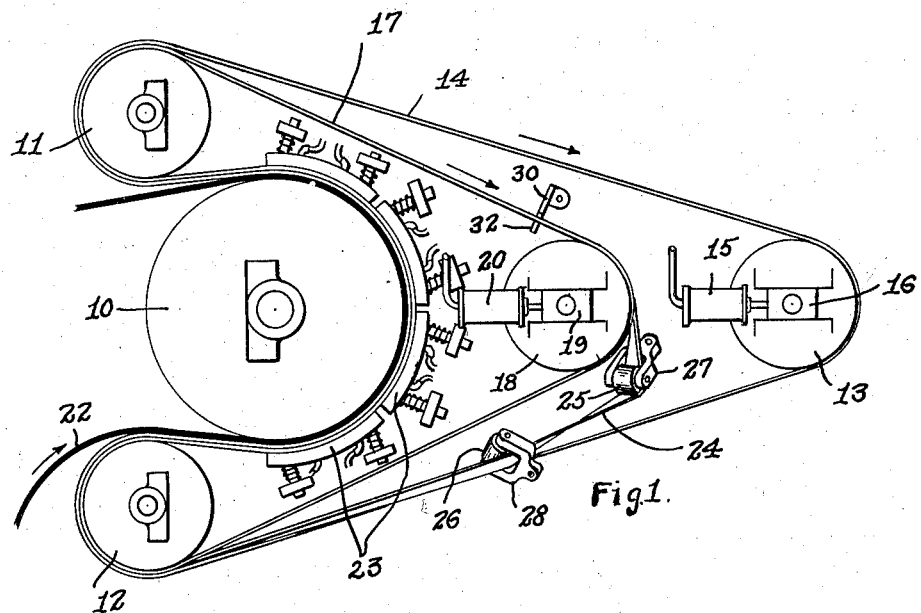
Figure 2:
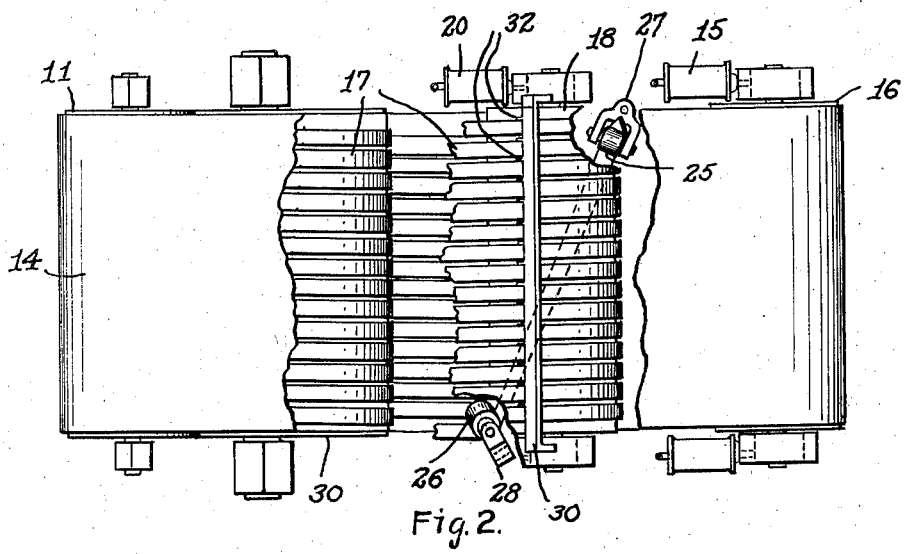

These and other features of the invention will be best understood and appreciated from the following description of a preferred embodiment thereof selected for purposes of illustration and shown in the accompanying drawing in which, Fig. 1 is a diagrammatic view of the elements of the machine in operative relation, and Fig. 2 is a plan view thereof but with portions of the bands being broken away.

The apparatus is shown in Fig. 1 in more or less diagrammatic manner. The machine frame 10 in which all the drums are journaled is omitted for the sake of clearness and the heated vulcanizing drum 10 is represented in its operative relation to the guide drums 11, 12 and 13. The latter are arranged so as to guide the pressure band 14 in a substantially three-sided course including a loop which passes about somewhat more than 180° of the circumference of the drum 10. The material 22 to be vulcanized is fed in sheet or strip form to the lower side of the drum 10, thence about the inner portion of its circumference and finally it is led away from the upper side of the drum. During its passage about the drum it is heated and engaged under severe pressure by the band 14 which, for that purpose, is maintained under tension by means of hydraulic cylinders 15 having pistons acting against the bearings 16 supporting the drum 13.

As already intimated, it is impractical to impart sufficient tension to the band 14 to develop the pressure of engagement requisite for compacting or molding certain classes of goods and in the machine illustrated in the drawing the pressure of the band 14 is supplemented by the pressure of an auxiliary band 17. This band 17 is guided over a drum 18 which is journaled inside the path of the tension band 14 in movable bearings 19 and urged rearwardly at all times by hydraulic pressure effective through cylinders 20. The auxiliary band 17 passes about the guide drum 12 between it and the pressure band 14, and then passes about the circumference of the vulcanizing drum 10 with the pressure band 14 interposed between it and the material. That is to say, the auxiliary band backs up and reinforces the pressure band 14 throughout its entire path of engagement with the material 22 upon the vulcanizing drum.

The auxiliary band 17 is narrower than the pressure band 14 and as illustrated in the drawing the auxiliary band is so relatively narrow that several loops or reaches thereof engage and back up the work engaging portion of the pressure band in relatively adjacent relation thereacross. As will be apparent the auxiliary band illustrated is endless. The reaches thereof which pass between the drums 11 and 12 and the drum 13 are parallel and the loops engaging the pressure band 14 over the vulcanizing drum 10 are also parallel. Furthermore, such arrangement requires that in traveling in an endless path the outermost reach on one side of said parallel reaches must be passed over to the outermost reach on the other side thereof. Such transverse passage of the band 17 is accomplished by guiding the portions 24 obliquely through the use of two rollers 25 and 26 mounted in yokes 27 and 28. The several reaches of the auxiliary band are arranged to move in adjacent paths and are kept in such relation by a guiding bar 30 extending across the said parallel reaches adjacent to the drum 18, the bar having spacing fingers 32 for keeping the individual reaches of the band properly positioned.

The machine is shown as equipped with segmental heaters 23 which are arranged to be maintained in yielding engagement with the auxiliary tension band 17 over an area in the coextensive path of the two bands about the circumference of the vulcanizing drum. The effect of these heaters is to heat the bands and thus subject the material to heat from that surface which is outwardly disposed on the drum 10 during the vulcanizing operation. The fact that both the bands 14 and 17 are of flat metal and are held in firm and continuous contact with each other throughout the area of contact of the material 22 with the band 14 renders the transmission of heat to the outer surface of the material efficient and uniform.

The details and mechanical devices illustrated comprises a good practical form of the invention but it is to be understood that they may be varied in form, disposition and arrangement and still be within the scope of the invention.

Having thus described my invention what I claim as new and desire to secure by Letters Patent of the United States is:

1. A vulcanizing machine having a heated drum, a pressure band arranged to run under tension in position for pressing the work against the periphery of the drum, a single auxiliary band narrower than the pressure band and having a plurality of reaches thereof engaging the outer surface of the pressure band throughout an arc concentric with the drum, and means for placing the auxiliary band under tension.

2. A vulcanizing machine having a heated drum, a pressure band arranged to run under tension in position for pressing the work against the periphery of the drum, a guiding drum, an endless auxiliary band narrower than the pressure band looped around and supported by said guiding drum and having a plurality of reaches thereof engaging the outer surface of the pressure band throughout an arc concentric with the heated drum, and means for placing the auxiliary band under tension.

3. A vulcanizing machine having a heated drum, a pressure band arranged to run under tension in position for pressing the work against the periphery of the drum, an endless auxiliary band narrower than the pressure band and having a plurality of loops thereof engaging the outer surface of the pressure band throughout an arc concentric with the drum, a drum supporting other loops of the auxiliary band, and means between the drums for maintaining the auxiliary band in proper alignment.

4. A vulcanizing machine having a heated drum, a pressure band arranged to run under tension in position for pressing the work against the periphery of the drum, an endless auxiliary band narrower than the pressure band and having a plurality of loops thereof engaging the outer surface of the pressure band through an arc concentric with the drum, said loops being arranged in relatively spaced relation laterally of the drum in said arc, and means for placing the auxiliary band under tension.

5. A vulcanizing machine having a heated drum, a pressure band arranged to run under tension in position for pressing the work against the periphery of the drum, a relatively narrow and endless auxiliary band having a plurality of loops thereof engaging the outer surface of the pressure band throughout an arc concentric with the drum, said loops being relatively and uniformly spaced laterally a distance less than the width of the auxiliary band, and rotary means supporting other loops of the auxiliary band.

6. A vulcanizing machine having a heated drum, a pressure band arranged to run under tension in position for pressing the work against the periphery of the drum, an endless auxiliary band having a plurality of loops thereof engaging the outer surface of the pressure band throughout an arc concentric with the drum, means supporting other loops of the auxiliary band and between which loops the auxiliary band extends in parallel reaches, guide means for maintaining the auxiliary band in proper alignment, the auxiliary band having a reach thereof extending transversely across the said parallel reaches, and means for supporting and guiding the said transversely extending reach from the outermost reach of one side of said parallel reaches to the outermost reach on the other side thereof.

7. A vulcanizing machine having a vulcanizing drum, a wide metallic tension band in position for pressing sheet material to be vulcanized upon the drum, and a single cable maintained under tension and guided to pass in a plurality of reaches longitudinally along and in pressure contact with the outer surface of the tension band where the latter encircles the drum.

8. A vulcanizing machine having a heated drum, a pressure band under tension and having a portion thereof extending about the drum in position to press the work thereagainst, a single flat auxiliary metallic band narrower than the pressure band and having a plurality of reaches thereof engaging the outer surface of the pressure band throughout an arc concentric with the drum at said portion of the pressure band, and a segmental heater in contact with the outer surface of the auxiliary band where it engages the said portion of the pressure band.

THOMAS M. KNOWLAND.